United States Patent
Cupler, II

[15] 3,687,564
[45] Aug. 29, 1972

[54] MULTIPLE DRILL HEAD
[72] Inventor: John A. Cupler, II, 10 Cupler Dr., Cumberland, Md. 21502
[22] Filed: Sept. 14, 1970
[21] Appl. No.: 71,892

[52] U.S. Cl. ..........................408/47, 74/63, 408/226
[51] Int. Cl. ...............................................B23b 39/16
[58] Field of Search .........408/47, 53, 226; 74/86, 63

[56] References Cited

UNITED STATES PATENTS

| | | |
|---|---|---|
| 305,209 | 9/1884 | Mahle............................408/47 |
| 210,866 | 12/1878 | Mahle............................408/47 |
| 819,587 | 5/1906 | Page et al. ....................408/47 |
| 1,075,588 | 10/1913 | McLellan..................408/47 X |
| 1,661,179 | 3/1928 | Jobst..........................408/47 X |

Primary Examiner—Francis S. Husar
Attorney—Colton & Stone

[57] ABSTRACT

A drill comprising an integral drill blade, crank and spindle and a multiple drill head for rotating a plurality of such drills.

4 Claims, 8 Drawing Figures

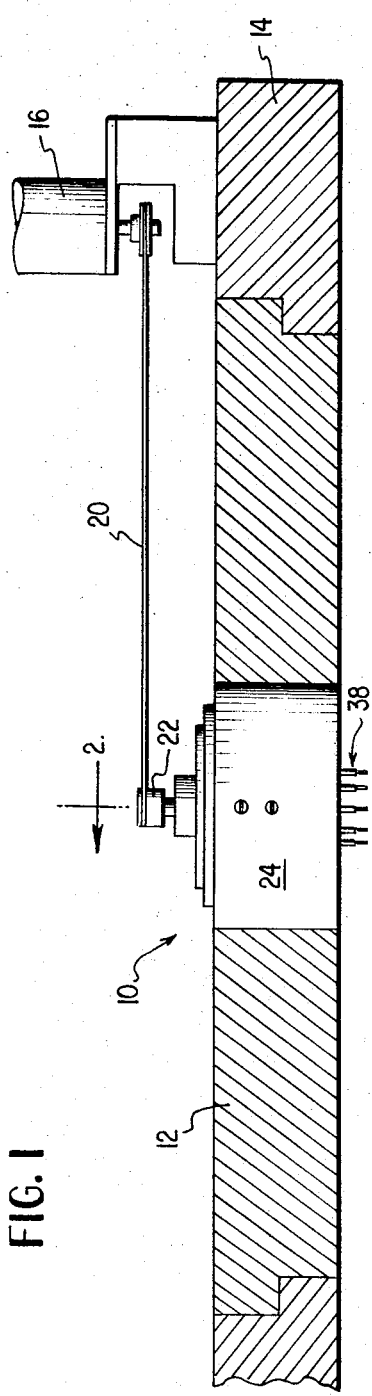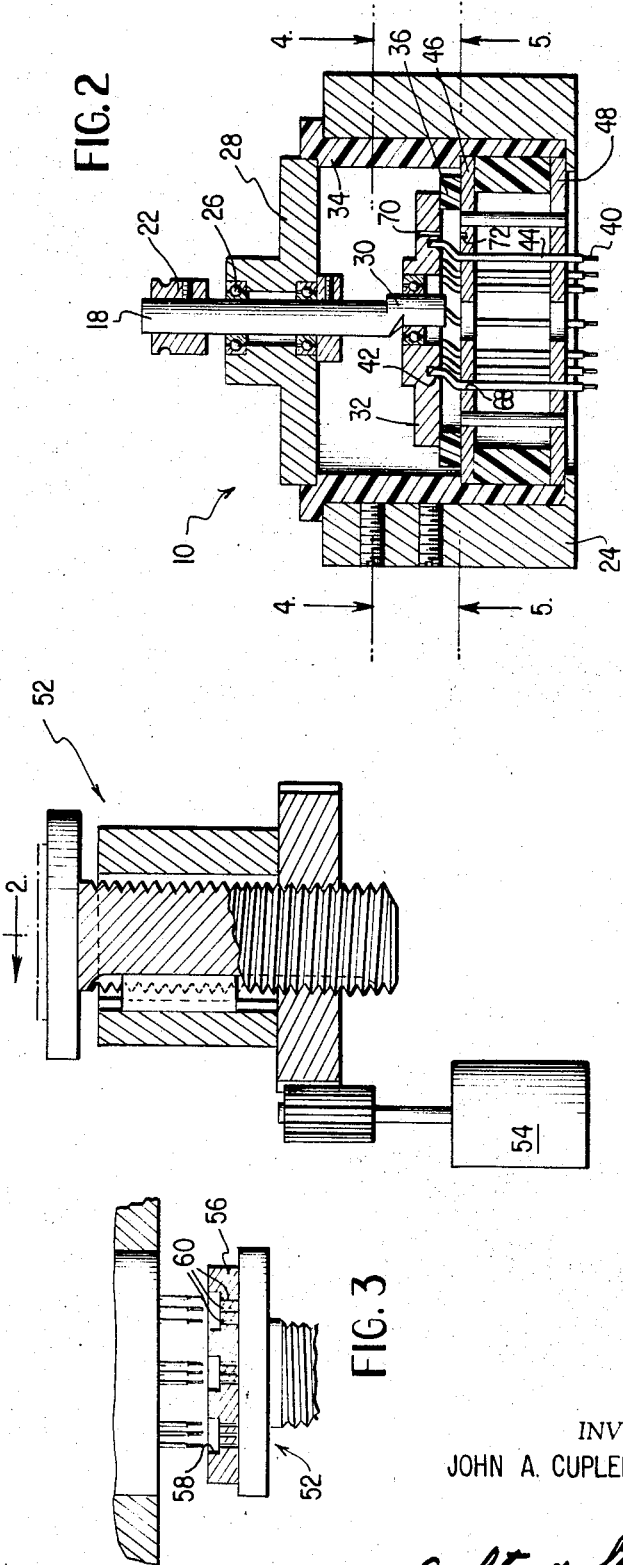
FIG. 1
FIG. 2
FIG. 3
INVENTOR
JOHN A. CUPLER, II
BY Calton & Stone
ATTORNEYS.

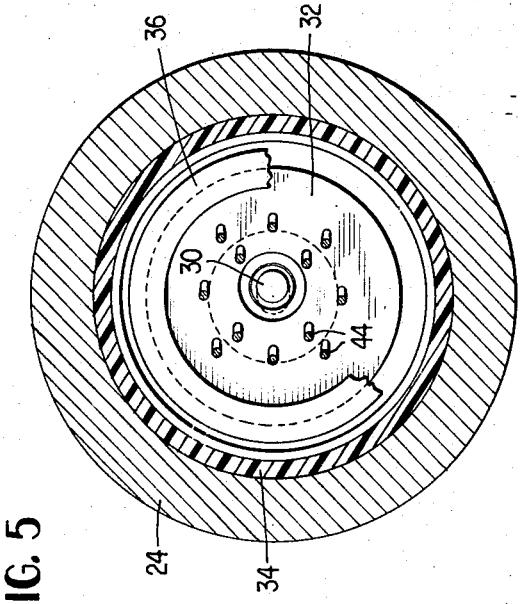
FIG. 5
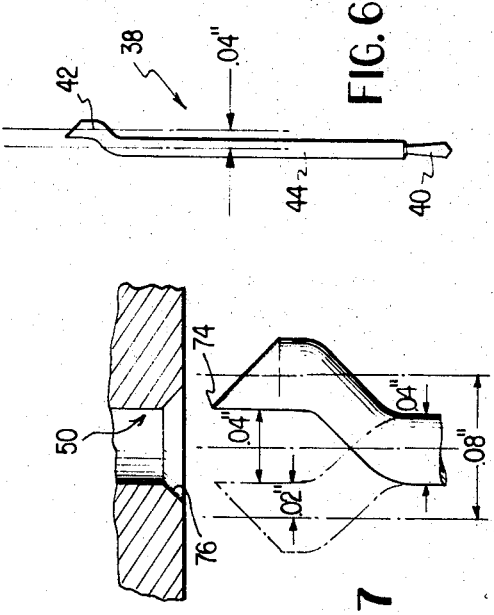
FIG. 6
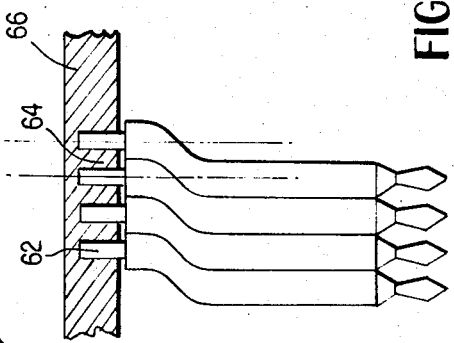
FIG. 7
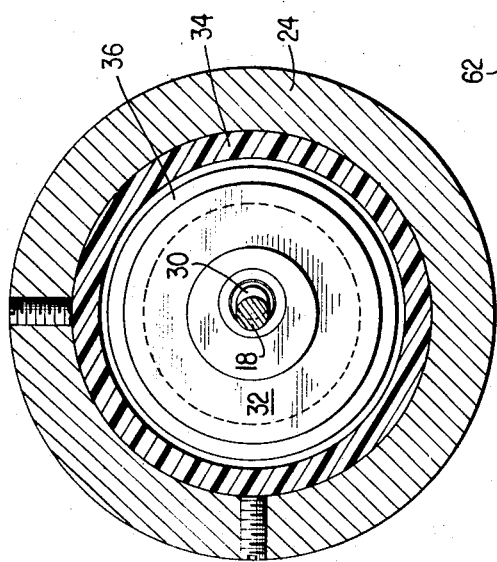
FIG. 4
FIG. 8
INVENTOR
JOHN A. CUPLER, II
BY Colton & Stone
ATTORNEYS.

MULTIPLE DRILL HEAD

BACKGROUND OF THE INVENTION

Known multiple drill heads employing crank operators for a multiplicity of drills or like rotary tools have, in accordance with accepted practice, made use of conventionally chucked tools whose spindles include a crank portion at one end and a tool receiving socket at the other. Exemplary disclosures appear in U. S. Pat. Nos. 2,253,153 and 2,342,251. These known multiple drill heads have not been adaptable, on the one hand, for micromachining techniques; and on the other, for the simultaneous formation of hole patterns which may include adjacent intersecting holes.

It has long been recognized that precision micromachining, such as in a bore diameter range below 0.040 inch for example, requires the use of an integrally formed drill and spindle for the reason that even the minute eccentricities necessarily inherent in any chucked tool, while not even observable in a macromachining operation, are fatal to micromachining. This is due, primarily, to the fact that these small drills must be maintained in pure compression and any eccentricity results in immediate drill breakage due to the lateral thrust component imposed thereon.

Additionally, in the case of conventional multiple drill heads employing conventional locking chucks for either large or small tools, it is impossible to machine an adjacent hole pattern utilizing tool spindle spacing which is less than the diameter of one tool spindle. U.S. Pat. No. 2,342,251 is exemplary. In the case of those tools employing rigid cylindrical sockets or chucks, as in U.S. Pat. No. 2,253,153, the support strength which must necessarily be present within the cylindrical socket wall, such as in the case of an integrally threaded socket, renders these type tools completely incompatible for use in the miniature world of microdrilling; such as in the formation of 0.010 inch diameter holes, for example.

An important feature for any multiple drill head which is to have utility for other than a preset hole pattern is the ability to quickly add, replace or remove drills and although some of the prior art devices do have this capability for macro size tools, it will be appreciated that any attempted chucking and unchucking operation on closely spaced miniature drill spindles would be a virtual impossibility requiring, at the least, removal of the tool and spindle, rechucking of the same and reinsertion in the tool head.

In view of the foregoing, it is apparent that even if multiple, chucked, miniature tools could be used it would be impossible to obtain a hole pattern spacing which is less than any predetermined minimum for the smallest tools. This is true because the chuck received portion of the drill must, by definition, have a lesser diameter than the chuck within which it is received and while the drill bit could be formed with a greater diameter than the chuck received portion thereof to permit the simultaneous formation of intersecting holes, this is not possible as the required bore size approaches the microscopic range. Thus, even to form a relatively large 0.040 inch diameter bore pattern involving intersecting holes, it would be necessary for the chuck portion of the spindle to have a lesser diameter which is clearly impractical if not impossible.

It is because of the fact that closely spaced hole patterns have not previously been susceptible of simultaneous formation that many assembly line techniques have required a plurality of sequentially performed single hole drilling operations and other clearly desirable techniques, such as the adoption of a standard printed circuit board pattern, have never been economically practicable. Exemplary of the former is the manufacture of spinnerettes for forming trilobular filaments. Such spinnerettes are formed by boring a plurality of relatively large blind bores having exemplary diameters of 0.0265 inch followed by the drilling of three equally spaced holes within each blind bore and extending through the opposite surface of the spinnerette. In a typical example, the three holes would have diameters of 0.007 inch and lie at the apices of an equilateral triangle whose sides are 0.007 inch. The establishment of a standard pattern for printed circuit boards which would provide the capability for the definition of circuit interconnections merely by the specification of coordinates in relation to the standard pattern, and to which all manufacturers could thus adhere, has long been regarded as desirable but prevented, at least in part, by the inability to form the small circuit interconnecting holes in sufficiently closely spaced relation to provide the virtually infinite number of possibilities required. This latter desiderata presupposes the ability not only to drill closely spaced holes but also to quickly add, remove or replace drills to meet different specifications with the same drilling equipment.

In the case of conventional multiple drill heads employing a crank operator integral with the drill spindle it has been virtually impossible, in the case of a drill head employing hundreds of simultaneously operable drills, to remove the crank operator element and then get all the cranks properly aligned to replace the same.

SUMMARY OF THE INVENTION

The invention is directed to an integral drill blade, crank and spindle and a multiple drill head for rotating the same wherein any desired number of drills may be rotated by a single drive unit. The drill spacing and pattern may follow any desired parameters even up to and including spacing patterns wherein the axes of adjacent holes are spaced apart a distance not exceeding the diameter of a drill shank. Stated differently, a row of drill shanks may be in parallel direct contact during the entire drilling operation.

A plurality of tools each consisting of an integral drill bit, crank and spindle are used in a multiple drill head which has a single operator for all of the cranks and an automatic aligning feature to insure appropriate registry of the operator and drill cranks when the same are separated for the addition, removal or substitution of tools.

Because the drill bit is integral with its spindle, the two are necessarily perfectly concentric and no lateral components are developed during a drilling operation which makes possible the use of such tools in microdrilling applications. Direct spindle contact, along at least one row of drills, is possible permitting the formation of intersecting holes by the use of drill bits whose diameters do not exceed that of their spindles whereby the drills may be readily removed by withdrawal of the whole tool merely by removing the single crank operator in the form of a single oscillator plate. The oscillator plate may be provided with a crank operator recess pattern which insures automatic registry of all the tool cranks with the oscillator plate when the same is removed.

DESCRIPTION OF THE DRAWINGS

FIG. 1 is a partly sectioned elevational view of a multiple tool head and associated work holder;

FIG. 2 is a vertical sectional view of the multiple tool head taken along line 2—2 of FIG. 1;

FIG. 3 is a fragmentary detail view illustrating a specific application of the invention;

FIG. 4 is a section taken along line 4—4 of FIG. 2;

FIG. 5 is a section taken along line 5—5 of FIG. 2;

FIG. 6 is an elevational view of a tool adapted for use with the multiple drill head;

FIG. 7 is a detail view of the crank end of the tool shown in FIG. 6 illustrating the automatic alignment feature with a fragmentarily illustrated oscillator plate; and FIG. 8 illustrates the manner in which a row of drills may be positioned in spindle engaging contact.

DESCRIPTION OF THE PREFERRED EMBODIMENTS

In FIG. 1 is illustrated a multiple tool head 10 detachably secured to a removable support section 12 on a work table 14. A variable speed motor 16 is drivingly interconnected with a driving crank 18 through a flexible drive belt 20 and drive pulley 22. Drive crank 18 is journalled within multiple drill housing 24 on bearings 26 carried in a removable upper housing section 28. The lower crank end 30 of drive crank 18 is centrally journalled in an oscillator plate 32 whose diameter is smaller than the inner diameter of removable housing sleeve 34 to permit the eccentric oscillation of plate 32 on a slide bearing ring 36 as the drive crank 18 is rotated by motor 16.

A plurality of drills 38 having integrally formed drill blades 40, cranks 42 and spindles 44 are journalled for rotation at spaced positions along the spindles thereof in spaced drill bearing plates 46, 48. The construction of the drills 38 is best illustrated in FIGS. 6 and 7 wherein exemplary dimensions have been applied for the purpose of facilitating a discussion of the manner in which the drill cranks may be automatically aligned with the appropriate driving recesses 50 in the oscillator plate. Each drill crank is offset by one drill diameter relative to the axis of the spindle and drill blade which is, for the purpose of illustration, assumed to be 0.040 inch. The drill blade is first formed at one end of the drill blank following which the crank portion 42 is formed and the drill is then hardened. The throw of the driving crank 30 is, of course, selected to insure the rotation of the multiple drills 38 about their spindle axes as the oscillator plate undergoes its eccentric movement.

Because of the fact that no portion of the drill has a diameter in excess of the spindle diameter journalled in the bearing plate openings, the drills may be readily withdrawn and/or inserted merely by removing housing section 28 and oscillator plate 32. The drills are restrained against downward movement by the engagement of their crank arm portions with upper bearing plate 46.

Although the multiple drill head is constructed as a unit handled tool which could be used in the manner of any other compound tool such as in combination with an automatic tool changer of the type disclosed in U.S. Pat. No. 3,478,419, it is herein illustrated for use with an adjustable work holder 52 including a reversible, variable speed motor 54 for positioning the same.

An exemplary machining operation involving the formation of a multiple hole pattern which has not previously been possible because of the relative dimensions involved is illustrated in FIG. 3 wherein a spinnerette 56 having preformed blind bores 58 is shown in position on the adjustable work holder 52. Those drills 38 not required to form the triangular hole patterns 60 are removed in the manner previously described and the work holder reciprocated in an advancing upward path by a controlled reversal of motor 54 as dictated by a tape control until all of the holes 60 have been simultaneously drilled. Thereafter, any or all of the missing drills may be replaced and the tool head is ready for a different machining operation.

The manner in which a plurality of drills may be placed in contacting proximity throughout their spindle lengths is illustrated in FIG. 8 wherein the upper crank ends 62 are reduced to leave a sufficient web 64 therebetween to impart rotation thereto from oscillator plate 66.

In order to insure that the oscillator plate 32 may be readily replaced on the drill cranks following its removal for the addition, replacement or removal of one or more of the drills 38; the drill crank receiving recesses 50 in the oscillator plate and the upper ends of the cranks are formed in such manner that once the axes of the oscillator plate recesses are perfectly aligned with the axes of respective drill receiving bores 68 in upper drill bearing plate 46, as by insertion of a guide pin (not shown) in aligned recesses 70, 72 in the oscillator plate 32 and bearing plate 46, the entry of each drill crank into its associated recess is automatically assured. It will be recalled that each crank arm 42 is offset from the spindle portion 44 by a one diameter spacing. In a typical example the spindle diameter may be 0.040 inch and the crank offset is thus 0.040 inch thereby defining an on center crank throw of 0.080 inch. The upper ends of each crank are non-symmetrically tapered to form a pointed apex 74 at that point on the crank arm 42 which is nearest the axis of spindle 44. Therefore, apex 74 is spaced 0.020 inch from the spindle axis and describes an arcuate path, when rotated about the axis of spindle 44, having a diameter of 0.040 inch. If, therefore, each crank receiving recess directly overlying the axis of each spindle be provided with a flared opening 76 having a diameter equal to or greater than 0.040 inch, the crank apex 74 will, of necessity, engage some point of the flared opening which merges smoothly with the smaller crank receiving portion of the recess terminating in a blind flat bottom bore. Thus, the camming engagement between the tapered upper end of each crank and the flared walls of the recess insures that upon the oscillator plate being pushed downwardly, each drill will rotate to that position necessary for the crank apex to bottom in its associated recess in the oscillator plate. Following the removal of the guide pin from recesses 70 and 72, the drill head is then ready for use.

I claim:

1. A multiple tool head, comprising; a tool bearing plate having multiple tool spindle receiving openings therein; a tool journalled for rotation in each of at least a plurality of said multiple openings; each said tool comprising an integral cutting bit, crank and spindle the diameter of which does not exceed that of said tool spindle receiving openings; a crank operator removably mounted on said tool head in driving engagement with the crank of each said tool; said crank operator and each tool crank including coacting camming means for automatically effecting said driving engagement; and means for rotating said crank operator.

2. The tool head of claim 1 wherein said crank operator includes a plurality of bores overlying said tool spindle receiving openings, means for aligning the axes of said bores and openings, and said coacting camming means comprising flared camming surfaces surrounding each said bore and an apical portion on said tool crank.

3. The tool head of claim 2 wherein said crank and said spindle are of a common diameter, said crank being offset from said spindle by a distance substantially equal to one diameter and said flared camming surfaces comprising a frustrum of a cone diverging toward the tool and having a maximum diameter in excess of the common diameter.

4. The device of claim 1 wherein the spindle diameter is not greater than about 0.04 inches.

* * * * *